United States Patent
Wilson

(12) 
(10) Patent No.: US 6,276,401 B1
(45) Date of Patent: Aug. 21, 2001

(54) HIGH TEMPERATURE COMPOSITE PIPE WRAPPING SYSTEM

(76) Inventor: Fred D. Wilson, 2823 Randolph St., Pasadena, TX (US) 77503

( * ) Notice: Subject to any disclaimer, the term of this patent is extended or adjusted under 35 U.S.C. 154(b) by 0 days.

(21) Appl. No.: 09/468,017

(22) Filed: Dec. 20, 1999

(51) Int. Cl.$^7$ .................................................. F16L 55/18
(52) U.S. Cl. .............................. 138/172; 138/99; 156/94; 156/187
(58) Field of Search .......................... 138/172, 99, 155, 138/175, DIG. 1; 156/94, 187

(56) References Cited

U.S. PATENT DOCUMENTS

| | | | |
|---|---|---|---|
| 2,795,523 | * | 6/1957 | Cobb et al. ............... 138/99 X |
| 2,924,546 | | 2/1960 | Shaw ........................ 156/94 |
| 3,531,345 | | 9/1970 | Torosian .................. 138/99 X |
| 3,870,350 | | 3/1975 | Loncaric ................... 138/155 |
| 4,042,559 | | 8/1977 | Abelson et al. ........... 428/142 |
| 4,148,127 | | 4/1979 | Somerville ............. 138/172 X |
| 4,195,669 | | 4/1980 | Ives et al. ................. 138/178 |
| 4,224,966 | | 9/1980 | Somerville ............... 138/172 |
| 4,388,381 | | 6/1983 | Mennicke et al. ......... 429/104 |
| 4,533,419 | * | 8/1985 | Pieslak et al. .......... 138/99 X |
| 4,559,974 | | 12/1985 | Fawley ..................... 138/172 |
| 4,589,562 | | 5/1986 | Fawley .................. 138/104 X |
| 4,676,276 | | 6/1987 | Fawley ..................... 138/172 |
| 4,700,752 | | 10/1987 | Fawley ..................... 138/172 |
| 4,756,337 | * | 7/1988 | Settineri ................... 138/99 |
| 5,030,493 | | 7/1991 | Rich ........................ 428/63 |
| 5,348,801 | | 9/1994 | Venzi et al. ............. 138/97 X |
| 5,518,568 | | 5/1996 | Fawley et al. ............ 156/175 |
| 5,632,307 | * | 5/1997 | Fawley et al. ............ 138/99 |
| 5,732,743 | * | 3/1998 | Livesay .................... 138/99 |
| 5,814,387 | * | 9/1998 | Orihara et al. .......... 138/99 X |
| 5,894,864 | * | 4/1999 | Rich ........................ 138/99 |

OTHER PUBLICATIONS

Corder, "On–Line Repair Using Epoxy–Filled Shells," Pipe Line Industry, pp. 25–32, Jul. 1991.
I.W. Industries, Inc. Brochure, "Brutem® And Poly–Plus® Protective Coatings", Jul. 1962.
Belzona Molecular, Inc. Brochure, "Belzona Molecular Super Metal: The All Purpose Molecular Metal for Repairing and Rebuilding Machinery Equipment", Oct. 1984.
U.S. Department of Commerce, National Bureau of Standards Brochure, "Voluntary Product Standard PS 15–69: Custom Contact–Molded Reinforced–Polyester Chemical–Resistant Process Equipment", Jun. 1970.

* cited by examiner

Primary Examiner—Patrick Brinson
(74) Attorney, Agent, or Firm—James L. Jackson; Mayor, Day, Caldwell & Keeton, LLP

(57) ABSTRACT

A method and apparatus for providing metal or non-metal vessels, including straight and curved pipes and various pipe connections, such as T's, elbows, swages, etc., and pressure containing vessels such as tanks, with an external composite lining of a webbing of biaxial or triaxial weave preferably composed of fiberglass which is pre-impregnated with a high temperature heat curable polymer composition capable of being heat cured at a temperature range of from about 275° F. to about 375° F. The vessel is prepared for bonding by abrasive cleaning and by solvent cleaning. Metal imperfections are then filled with an epoxy. A small amount a quick setting epoxy is employed to attach one end of the web to the external surface of the vessel in oriented position for wrapping of the web in intimate surface-to-surface contact with the vessel. During wrapping only enough tension is applied to the pre-impregnated webbing to eliminate any wrinkles. The number of layers of the impregnated webbing will be determined by the safe pressure containing capability of the pipe or vessel and its composite lining. An external heating element is then placed about the wrapping of pre-impregnated webbing material so as to be in substantially intimate relation therewith and is energized to apply sufficient heat for a sufficient period of time to completely cure the epoxy surface filler and to cure the polymer resin components of the pre-impregnated woven wrappings of webbing.

20 Claims, 2 Drawing Sheets

HIGH TEMPERATURE COMPOSITE PIPE WRAPPING SYSTEM

BACKGROUND OF THE INVENTION

1. Field of the Invention

This invention relates generally to external structural enhancement of the wall structure of pressure containing metal vessels such as pipes, tanks, containers, etc. to minimize the potential for pressure induced failure thereof, to accommodate deterioration thereof by corrosion, erosion, surface divots, etc. and to enhance the pressure containing capability thereof. More specifically, the present invention concerns the provision of a novel method and apparatus for bonding at high temperature a chemical resistant wrapping of composite material about a pressure containing vessel, such as a pipeline, tank or the like, and curing it in place by application of predetermined heat for a predetermined period of time to thus provide an external structural component that enhances the structural integrity of the pressure containing vessel. Even more specifically, the present invention is directed to the application of a chemical resistant wrapping of biaxially or triaxially woven fiberglass and a polymer composite material in the form of a high temperature range epoxy, such as that sold under the trademark BTL Methylon resin, which becomes cross-linked in the presence of a phenylic resin and a catalyst, such as orthophosphoric acid, at a temperature in the range of from about 18020 F. to about 350° F.

2. Description of the Prior Art

Cylindrical metal objects such as pipes, tanks and other pressure containing vessels are often exposed to hazardous environmental conditions, including corrosive conditions, erosive conditions and conditions having significant changes in temperature. Such cylindrical objects are often subjected to significant internal pressure, such as the pressure of fluid flowing through a pipeline, the pressure of fluid contained within a pressure vessel, the hydrostatic or vapor pressure of a liquid being contained, etc. When the external or internal wall surface of a pipe or other pressure containing vessel becomes structurally degraded by corrosion or erosion the wall thickness of the vessel becomes diminished in the corroded or eroded region thus diminishing the safe pressure containing capability of the vessel. Corrosion or erosion of the vessel wall thickness can result from the corrosive environment in which the vessel is located or the corrosive or erosive nature of the product flowing through or being contained by the vessel. Diminished vessel wall thickness can also be caused by mechanical damage to the vessel, such as by impact with other objects, scraping or gouging of the vessel wall by other objects, etc. This diminished wall thickness makes the vessel subject to pressure induced rupture at the region of diminished wall thickness. It is desirable to provide a structural repair system that has the inherent effect of restoring the thickness of the vessel wall from the standpoint of resistance to pressure responsive rupture. When pipelines become so degraded they will typically be re-rated to a lower pressure handling capability, so that productive service of the pipeline is diminished. It is desirable to provide a protecting and structurally enhancing external layer of material which is capable of being applied insitu and which can permit an otherwise degraded pipeline to be restored to it originally designed pressure containing capability.

It has been determined that rupture of corroded, eroded or otherwise damaged pipes, tanks and other pressure containing metal objects can be significantly retarded by the addition of an external reinforcement layer that intimately engages and preferably is bonded to the external surface thereof. It has also determined that the addition of an external reinforcement layer of corrosion and erosion resistant material to pressure containing vessels can significantly retard further deterioration of the wall thickness of the vessel and can thereby significantly extend the service life of pipes, tanks and other pressure containing vessels. It has also been determined that structural repair of this nature can be accomplished through application of polymer, fiberglass and other reinforcing compositions to the external surface of vessels without taking the vessels out of service during the period repairs are being accomplished.

It is desirable to provide pipes and other pressure containing vessels with an external layer of structural material that enhances the structural integrity thereof and which provides a durable external protective layer that provides pressure containing metal vessels with protection against corrosion and erosion and which also provides such vessels with an external insulation barrier to enhance the resistance of the vessels to thermal expansion and contraction.

Various non-metal layers of material have been applied to pipes and other pressure containing vessels for protection against stress fractures and to provide for enhanced pressure containing capability as well as correcting vessel wall defects caused by corrosion, erosion, mechanical gouging, etc. It is known to cement wrapped strips of pre-cured polymer composite wrapping material about pipes to correct wall defects, retard stress fracturing and to enhance the structural integrity and pressure containing capability of the pipe. Such materials, however, being strips of pre-cured polymer material, while effective for being wrapped about straight sections of pipe, cannot be used effectively for wrapping various types of pipe fittings, such as "T's", elbows, and the like. This undesirable factor significantly limits the commercial viability of this particular product. Additionally, the pre-cured state of this type of pipe wrapping material makes bonding of the wrappings or laminations of the material about the pipe and bonding of the overlapping layers of the material to each other virtually impossible to accomplish. Such pipe wrapping material is subject to de-lamination and is also subject to leakage as pressurized material such as liquid leaks from a wall defect opening in the wall structure of the pipe and migrates along the interface of the polymer wrapping material with the pipe surface, propagating de-lamination until a point of leakage, typically an end of the repair, is encountered. Moreover, the initial structural integrity of pipe repair or structural enhancement using pre-cured polymer composite pipe wrapping material is determined by how well the material is layered as it is wound about and drawn tightly about the pipe.

A serious limitation of most polymer wrappings of pipe and other pressure containing vessels for the purpose of wall repair or wall strengthening is that such materials often begin to degrade when the ambient temperature or the temperature of the pipe or vessel becomes elevated above a relatively low temperature, such as 180° F., for example. Thus, where the ambient temperature of the pipe is above 180° F. such a composite pipe repair can neither be properly installed or properly function. In the chemical and petrochemical industries and in certain temperate regions of the world such a low temperature repair system will not be found satisfactory. It is desirable therefore to provide a pipe wrapping system having the capability of being installed and having the capability of effective operation under conditions of elevated temperature, such as in the range of about 275°

F. to 375° F. for example. It is also desirable to provide a multilayer wrapping of polymer material about pipe and other pressure containing vessels wherein the various layers thereof are integrated by polymerization and will not become de-laminated.

After a pipeline has been installed for a number of years the conditions near the pipeline right of way can change such that its safety to the immediate environment requires a re-rating change, typically lowering the maximum operating pressure rating of the pipeline. Also, in the event of deterioration of the pipeline by corrosion, the pressure rating of the pipeline may need to be lowered to maintain the same safety standards of its installation, a condition known as "de-rating". At times, it may become desirable to increase the pressure rating of a pipeline to enhance its flow handling production or to provide the pipeline with external reinforcement to maintain the pressure rating for which the pipeline was originally designed. Heretofore, application of an epoxy or other polymer externally of the pipe to enhance the pressure containing capability thereof has not been a viable option. It is desirable, therefore, to provide a novel polymer composite repair method which is designed to remediate corroded and mechanically damaged pipes or vessels and which may also be utilized to permit re-rating of the pipeline to a higher maximum operating pressure rating to thus enhance the productivity of the pipeline. It is also desirable to provide an external wrapping system which may also be employed to enable insitu re-rating of the vessels or pipes to a safe and higher pressure containing capability.

It has been determined through testing that pipes, especially when deep pressure cycled in cold conditions, can be subject to polymer disbonding from the external pipe surface. Also, if the polymer material is pre-cured and then strips of precured polymer are wrapped about the pipe and cemented or bonded in wrapped condition about the pipe, deep cycling of the pipe can also result in disbonding between the wrapped layers. Cathodic disbandment of pipe wraping can also be a problem when pipes are buried and subject to electrolysis. It is desirable therefore to provide a method and materials for application of polymer wrapping to pipes, tanks and other vessels and which is chemically resistant to mild acid and alkaline environments and which effectively meets the ASTM G8 standards regarding cathodic disbonding for pipes as well as ASTM G9 standards regarding water penetration into pipe coatings.

Particularly when pipe is subjected to seawater, such as is the case with offshore oil and gas production, it is desirable to have the capability for cleaning and protecting the pipes with polymer coatings to resist the effects of corrosion and marine life. For purposes of repair, it is desirable to provide a polymer composite repair composition having the capability for use insitu for repairing and coating pipes in the subsea environment. Currently, a commercially available polymer composition that may be used for protective wrapping of pipes, tanks and other structures in an underwater environment is not known.

SUMMARY OF THE INVENTION

It is therefore a primary feature of the present invention to provide a novel method for providing pressure containing vessels such as pipes with an external multilayered reinforcing and protective composite material which accomplishes repair of corroded, eroded or other deteriorated regions of pipe walls and which is capable of enhancing the pressure containing capability thereof;

It is also a feature of the present invention to provide a novel method for applying a multilayered polymer wrapping about pipe and other pressure containing vessels at ambient temperatures and for operational service at temperature ranges from about 275° F. to 375° F.;

It is another feature of the present invention to provide a novel method for enhancing the pressure resisting capability of the corroded, eroded or otherwise damaged metal wall structure of pipes and other pressure containing vessels through the provision thereon of a multilayered external covering of non-metal composite reinforcing material which is disposed in intimate bonded engagement with the external wall surface and having layers which are in intimate bonded relation with one another;

It is an even further feature of the present invention to provide a novel method for repairing pipes and other pressure containing vessels having external surface material deterioration by corrosion, erosion and the like, by filling the external surface imperfections with a structural filler that bonds to the metal wall surface in the deteriorated region and by then providing an external layer of non-metal composite reinforcing material which is disposed in intimate bonded engagement with the external wall surface thereof and which enhances the resistance of the vessel to pressure induced rupture;

It is also a feature of the present invention to provide a novel method for providing pipes, tanks and other pressure containing vessels with an external wrapping of woven fiberglass fabric having a biaxial or triaxial weave and being impregnated with a heat curable polymer composite and, after wrapping the vessel, heat curing the polymer binder in place for a predetermined period of time and at a temperature range of from about 275° F. to 375° F. to form an integral structural layer of high temperature resistant composite material about the pipe;

It is also a feature of the present invention to provide a novel method for providing pipes, tanks and other pressure containing vessels with an external wrapping of pre-impregnated biaxially or triaxially woven fiberglass fabric/heat curable polymer composite and, after wrapping the vessel, heat curing the polymer binder in place at an appropriate temperature and for a predetermined period of time to form an integral structural layer of cross-linked polymer composite material about the vessel which enhances the rupture resistance of the metal wall structure thereof and provides the wall structure with resistance to further corrosion and erosion;

It is another feature of the present invention to provide a novel wrapping composition for pipes and other pressure containing vessels which is wrapped about a vessel in the uncured state thereof and which is cured by application of heat from a surrounding heat source for a sufficient period of time to accomplish complete polymerization of the polymer binder thereof and to thus form an integral protective and reinforcing layer that is in intimate surface-to-surface bonded contact with the external surface of the vessel;

It is also a feature of the present invention to provide a novel wrapping composition for pipes and other pressure containing vessels which effectively ensures against mechanical disbondment and cathodic disbondment in a manner satisfying the standards of ASTM G8 and G9;

It is an even further feature of the present invention to provide a novel preimpregnated polymer wrapping composition for repairing and enhancing the pressure containing capability of pipes and other pressure containing vessels and which has a long shelf life even under quite cold and very warm ambient conditions to thereby provide for effective use of the material in a wide range of environments and climates; and It is another feature of the present invention to provide a novel wrapping composition for pipes and other pressure containing vessels which may be applied insitu in an underwater environment.

Briefly, the various objects and features of the present invention are realized through the provision of a novel method and apparatus for repairing pressure containing metal vessels such as pipes, tanks and other pressure containing vessels while the same may be under pressure and in service by installing an external wrapping of non-metal composite webbing, which is preferably a woven fiberglass or any other suitable fabric material having a biaxial or triaxial weave and which is pre-impregnated with a suitable heat curable polymer such as polyester resin, bisphenol ester resin, or the like. Preferably the biaxial or triaxial woven fiberglass or other suitable fabric is impregnated with a resin composition including a coating intermediate containing a mixture of the alkyl ethers of mono-, di-, and tri-methylol phenols, manufactured and sold by Seegott, Inc. under the Registered Trademark "Methylon" resins, combined with an epoxy and cured by application of heat in the range of from about 275° F. to 375° F. in the presence of a catalyst, such as orthophosphoric acid, for a sufficient period of time to achieve complete polymerization. The epoxy and Methyon resin composition will not become polymerized until sufficient external heat is applied. Thus the polymer composition will permit storage thereof at a wide temperature range to permit its effective use in most parts of the World where pipelines exist, without requiring careful attention to specific thermal control. Because of its high polymerization temperature, the pipe wrapping composition will not become degraded or preliminarily polymerized when subjected to handling and storage temperatures in most parts of the World.

Prior to wrapping of the metal vessel the external surface is prepared for bonding by thorough cleaning, grinding, sand blasting, etc. and by removing any bonding inhibitors that might be present by solvent cleaning. Metal imperfections, such as corroded, eroded, abraded or otherwise deteriorated regions of the wall structure of the pipe are then filled with epoxy or other suitable polymer filler that bonds to the metal surface and adds structural integrity to the metal structure. If the pipe or vessel is composed of material other than metal, it is cleaned and prepared in a manner appropriate for the material from which it is composed. Means is then employed to attach one end of the fiberglass/polymer pre-impregnated biaxial or triaxial weave webbing to the exterior surface of the vessel. A double sided adhesive tape may be employed for this purpose or a polymer, i.e., epoxy for example, webbing fixation may be employed. For example, a small surface patch of the vessel can be coated with a fast setting epoxy, such as Armor plate 990QC, manufactured and distributed by Armor Plate, Inc. of Pasadena, Tex. or Ciba Epoxy Araldite 2043. One end of the pre-impregnated biaxially or triaxially woven webbing is then attached to the uncured epoxy in properly oriented position for wrapping of the webbing about the vessel. The wrapping of preimpregnated webbing, with its vessel side backing sheet being removed during wrapping, is then wrapped about the vessel in a wrinkle free manner to ensure intimate surface-to-surface contact with the vessel and to ensure against the capture of air bubbles between layers of the wrapping. When unusually shaped objects, such as pipe T's, elbows and swages are being wrapped, the inherent lateral flexibility of the uncured pre-impregnated biaxially or triaxially woven webbing will permit the webbing to be precisely formed to the outer surface geometry of the object. The layers may be somewhat overlapped when wrapping these unusual layer configurations, but because of the subsequent curing that will later take place under the influence of heat, it is only necessary to ensure that the surface area of the object is covered with at least the minimum layers of webbing to accommodate designed pressure containing capability or enhancement of the object. The uncured pre-impregnated fiberglass/polymer composite webbing will be wrapped about the vessel until a desired number of layers will have been established, the number of layers determining the ultimate pressure resisting characteristics of the structural repair. During wrapping only enough tension is applied to the pre-impregnated webbing to eliminate any wrinkles and to ensure complete surface-to-surface contact between layers of the wrapping material. When pipe connection fittings such as T's and elbows are encountered, the pre-impregnated webbing will be wrapped about the pipe fittings as well, being sure that the layers of pre-impregnated webbing are in wrinkle free, integrally layered assembly about the outer surface of the fittings. The curing process for the wrapped webbing will develop an integral bond between layers as well as to the object, thus enhancing the resistance to the completed wrapping against disbondment.

For curing of the wrapping about the pipe, an external heating element in the form of a sleeve or blanket is then placed about the wrapped webbing of pre-impregnated woven biaxial or triaxial weave fabric material so as to establish substantially intimate relation of the wrappings and, when energized, the heating element will apply sufficient heat to the impregnated webbing for a sufficient period of time to completely cure the epoxy surface filler and to cure the polymer components of the pre-impregnated wrapped webbing. Preferably, the high temperature curing range of the pipe wrapping composition will be from about 275° F. to 375° F. In response to the application of heat the heat curable polymer forms a polyvalent bond between the layers so that the resulting cured repair wrapping about the vessel is in the form of an integral, bonded polymer band with a plurality of layers of biaxial or triaxial woven fiberglass fabric located in layers therein. As the high temperature heat curable polymer becomes cured, it is subject to a small amount of shrinkage, so that the resulting polymer band provides the vessel with a tight, firmly bonded layer that enhances the pressure containing capability of the vessel as well as providing the repaired section of the vessel with enhanced structural integrity that can, depending upon the layers of wrapping material that are applied to the vessel, exceed the structural parameters of the vessel in its original state. This feature enables existing pipelines to be wrapped, not only for structural repair, but also for enhancing the operating pressure range thereof and thus enalbling the pipeline to be re-rated to a higher maximum operating pressure.

When pipe repair is needed and the pipe is situated in water, the present invention will also be effective. Wrapping of the webbing about the submerged pipe is done in a manner ensuring displacement of any water from between the layers of webbing. After such wrapping has been accomplished, the heat of polymerization may be applied to the uncured wrapped pre-impregnated webbing by a heating blanket having external thermal insulation to ensure completion of polymerization prior to excessive heating of the surrounding water. Typically however, the water surrounding the webbing will be circulated by thermal convection so that excessive heating is not a significant problem.

The resulting pipe wrapping can minimize dimensional changes of the pipe as the result of pressure changes therein and as a consequence minimize further deterioration in the metal wall structure of the pipe. The pipe lining is durable because of its polymer and biaxial or triaxial webbing constituency so that erosion of the pipe or the lining of the pipe is minimized. The heat curable fiberglass/polymer wrapped lining of the pipe is physically bonded to the external surface of the pipe and thus excludes corrosive material and air from contact with its metal structure so that further external corrosion or erosion of the pipe is prevented so long as the lining remains unbroken. The wrapped repair or structurally enhancing lining has sufficient resiliency to expand and contract along with the metal wall structure of the pipe without fracturing, so that the lining will remain in its originally applied state for extended periods of time under normal operating conditions of the pipe. The joints defined by the abutting edges of adjacent sections of wrapped repair webbing are secured by filling them with an epoxy composition, such as Armor Plate 990QC or Ciba Epoxy Araldite 2013, which provides enhanced sealing at any edge joints that are defined by the external lining. Additional wrappings of heat curable fiberglass/polymer material are placed about the edge joints and are cured in place by application of external heat to thus provide the resulting pipe lining with enhanced structural integrity at the edge joints.

Other and further objects and features of the present invention will become obvious and inherent from a description of the method and apparatus that is set forth hereinbelow.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an elevational view illustrating a horizontally oriented pipe having a repair or structurally enhancing external lining that is applied to the pipe in accordance with the present invention and using the pipe wrapping components and method of the present invention;

FIG. 2 is a sectional view taken along line 2—2 of FIG. 1 and showing the pipe and the pipe repair or structurally enhancing lining thereof;

FIG. 3 is a fragmentary sectional view of FIG. 2, showing the pipe and pipe repair or structurally enhancing lining in greater detail as compared with FIG. 2;

FIG. 4 is a fragmentary longitudinal sectional view taken through the pipe and pipe repair or structurally enhancing lining along line 4—4 of FIG. 3;

FIG. 5 is a diagrammatic illustration showing a webbing of fiberglass or other suitable fabric material being woven with longitudinal, transverse and diagonal strands to thus achieve a triaxially woven fabric webbing according to the teachings of the present invention and which adds structural integrity to the external wrapping along three axes;

Figure 6:
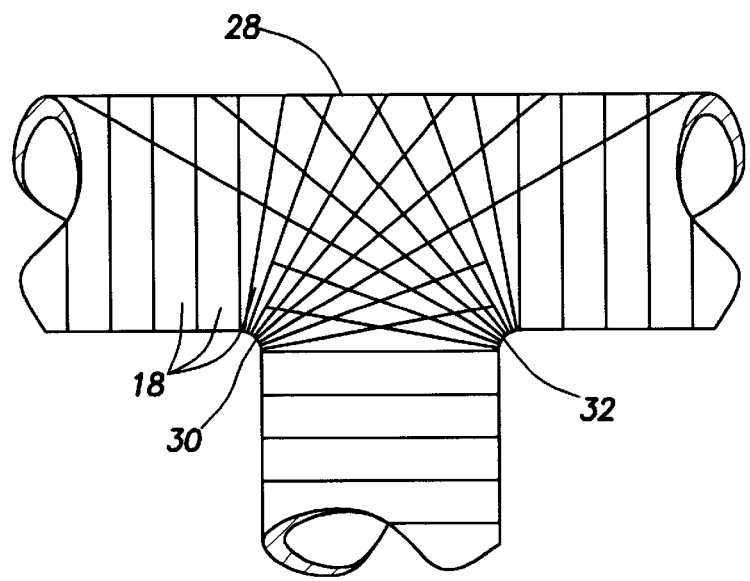
Figure 7:
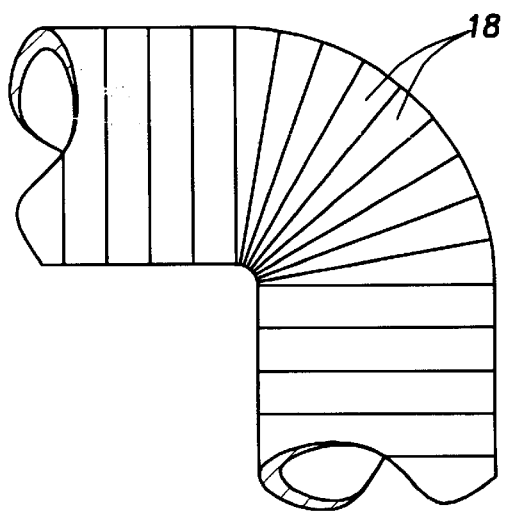

FIG. 6 is a diagrammatic illustration shown in partial section and showing a pipe "T" fitting provided with a structurally enhancing and protective wapping of polymer composite material and also showing the orientation of strip pipe wrapping material to accommodate the configuration of the "T" fitting so as to provide its entire external surface with at least the number of layers that is desired for designed structural enhancement; and FIG. 7 is also a diagrammatic illustration shown in partial section and showing a pipe elbow fitting provided with a structurally enhancing and protective wapping of polymer composite material and also showing the orientation of strip pipe wrapping material to accommodate the configuration of the elbow fitting.

DETAILED DESCRIPTION OF PREFERRED EMBODIMENT

Figure 1:
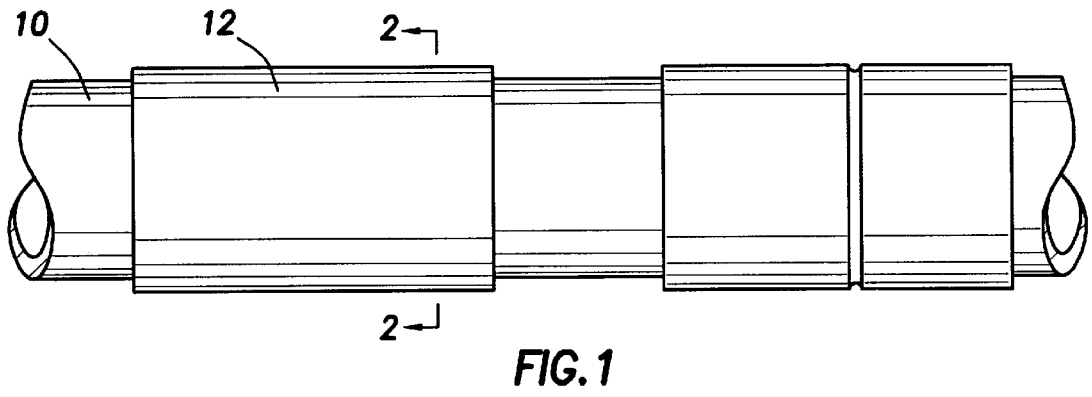
Figure 2:
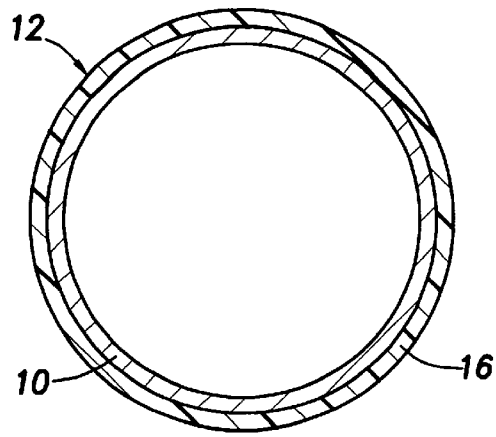
Figure 3:
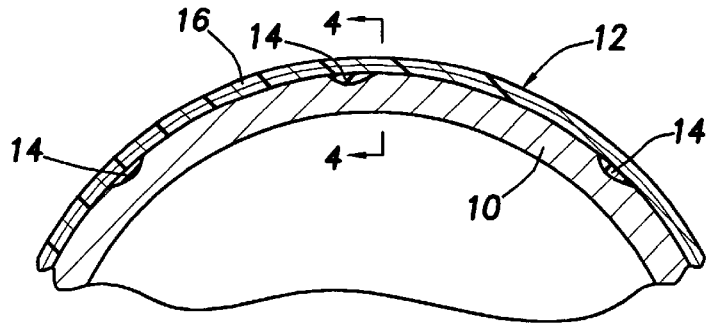
Figure 4:
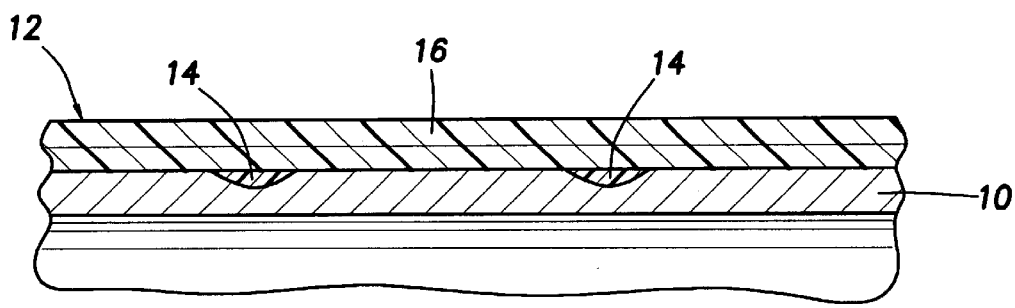

Referring now to the drawings and first to FIG. 1 a pressure containing pipe in the form of a horizontally oriented pipe is shown at 10, the pipe having an external wrapped repair or structurally enhancing lining of heat curable wrapped biaxially or triaxially woven fiberglass/polymer impregnated webbing material shown generally at 12 which comprises a plurality of layers of material that is applied thereto according to the method set forth herein. Although the drawings represent an external repair lining for pipes, it should be borne in mind that protective repair lining of this invention and its method of application is equally applicable to tanks and other pressure containing vessels as well. Additionally, pipe connections, such as T's, elbows and the like, may be wrapped with a composite lining according to the teachings set forth herein for the purpose of repair or to enhance the pressure containing capability of the pipeline system. Thus, the description of the present invention, as set forth herein is intended as exemplary of one representative embodiment of this invention and is not intended to be taken as limiting the spirit and scope of the invention.

The pipe 10 is initially prepared for the repair lining procedure by removing any foreign matter from its external surface. Such external surface preparation can be accomplished by grinding with a disk grinder or other suitable grinder to remove paint residue, scale, rust and the like. Surface preparation may also be accomplished by sand blasting, sanding or other forms of abrading. It is desirable to remove all external material that might inhibit bonding of polymer material thereto, leaving the external metal surface that is clean and bright. After this has been done the external surface of the pipe can be further cleaned with a suitable solvent to remove all traces of oil and any other bonding inhibitor.

After completion of surface preparation any surface imperfections such as rust pits, gouges, surface erosion, surface divots and the like are filled with a polymer filler material 14 such as an epoxy that is capable of achieving physical bonding with the metal of the pipe and leaving the filled pipe substantially cylindrical. A suitable polymer filler material for this purpose may take the form of a self-curing epoxy composition having its activator properly mixed therewith. A suitable epoxy for this purpose may take the form of Armor Plate 990QC epoxy putty, manufactured by Armor Plate, Inc. of Pasadena, Tex. or Ciba Epoxy Araldite 2013. The Armor Plate 990QC epoxy is an epoxy composition having a working life of up to two hours at 77 degrees F., and will become cured completely and more rapidly upon application of heat in the manner discussed hereinbelow.

Other polymer compositions of equal quality and capable of bonding to metal surfaces may also be used as the filler for surface imperfections.

Figure 5:
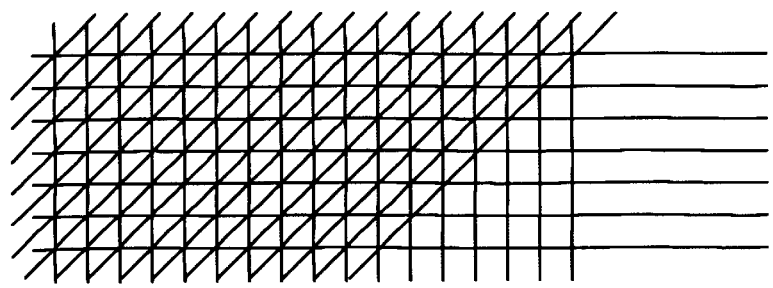

The filled pipe is then provided with a wrapping 16 of pre-impregnated heat curable biaxially or triaxially woven fiberglass/polymer webbing material 18 which is wrapped in intimate engagement with the surface filler of epoxy composition that is applied to surface imperfections of the pipe immediately before wrapping or during the process of wrapping. This wrapping of pre-impregnated heat curable composite webbing comprises a biaxial or triaxial woven fiberglass structural webbing 20 which is shown in FIG. 5. The woven fiberglass webbing has longitudinal webbing members or strands 22 running along the length of the wrapping material and transverse webbing members or strands 24 which are interconnected to the longitudinal webbing members in a woven fashion. The triaxially woven fiberglass webbing material will also have webbing strands or threads 26 in woven assembly with the longitudinal and transverse strands and oriented in substantially 45° angular relation with both the longitudinal and transverse webbing strands. The woven fiberglass material has considerable structural integrity in the linear or longitudinal direction and in the transverse direction so that the resulting impregnated woven fiberglass can be applied to objects of various geometry with ease and provides significant structural integrity both longitudinally and in the directions of the biaxial or triaxial components of the woven fabric. The structural web component may also take the form of a loosely woven fiberglass fabric so as to accommodate a significant volume of polymer composition within the interstices of the woven strands so that cross-linking of the polymer constituent will efficiently bind to the fibers of the woven fiberglass material and will define an efficient polyvalent bond by thermally initiated chemical reaction. The linear and transverse webbing members are preferably composed of fiberglass, but can be composed of any suitable woven material having suitable structural integrity to serve the intended function of pipe strength enhancement. One or more layers of the woven fiberglass wrapping web are assembled and are impregnated with a heat curable resin such as polyester or bisphenol ester resin or an epoxy resin which is cured with a phenolic resin and a suitable catalyst and which will remain uncured until predetermined heat is applied thereto, thus permitting its efficient storage virtually anywhere in the World for extended periods of time without any degrading thereof. Typically the pre-impregnated fiberglass strip material will be provided with a suitable impervious backing sheet on each bonding surface thereof and the strip material will be stored in rolls until its use is desired. The backing sheets will be peeled away from the bonding surfaces of the strip material when being installed about pipes, tanks or other pressure containing vessels. After installation of a desired number of wraps of the pre-impregnated fiberglass webbing material for designed structural enhancement of the vessel, the polymer constituent of the pre-impregnated webbing will be cured or cross-linked by application of heat in the range of from about 225° F. to about 375° F., for example, for a predetermined period of time, from about one-half hour to about two hours, for example.

As mentioned above, the pre-impregnated webbing is preferably backed with impervious backing sheets which prevent contact of the polymer with the pipe or with itself before the heat curing process is initiated. The backing sheet facing the pipe is peeled away from the polymer filled webbing as the webbing is wrapped about the pipe so that, during the wrapping procedure the polymer filled biaxial or triaxial webbing will directly contact the cleaned surface to be repaired and will directly contact the epoxy filler material filling the surface imperfections of the pipe being repaired or structurally. It should be borne in mind that the epoxy filler material need not be completely cured at this point in the pipe repair wrapping procedure. The heat applied subsequently for heat curing the polymer filling of the woven fiberglass webbing will accelerate the self curing process for the epoxy filler.

For installation of the pre-impregnated heat curable fiberglass/polymer webbing material 18, a layer of quick setting epoxy composition may be applied to a small patch, such as roughly three inches by twelve inches for example, of the filled pipe. A quick setting epoxy composition having desirable characteristics for this purpose is Armor Plate 990QC or Ciba Epoxy Araldite 2043. Working rapidly, the exposed end of the pre-impregnated webbing, with its lower backing sheet peeled away at the end, is brought into securing contact with the layer of quick setting epoxy and is oriented for cylindrical or spiral wrapping of the pipe as desired. A period of time of only about 10 minutes is typically required for curing of the quick setting epoxy to thus secure the end of the pre-impregnated webbing to the pipe. As the pre-impregnated webbing is wrapped about the pipe the lower backing of the web is continuously peeled away so that the uncured resin of the webbing will come into surface-to-surface contact with the surface of the pipe or with previously applied layers of the pre-impregnated webbing. The pre-impregnated web material is generally cylindrically wound about the pipe, with only sufficient tension being applied to the web to ensure that it becomes wrapped in wrinkle free manner about the pipe. Alternatively, however, the pre-impregnated web material may be would spirally about the pipe or may be wound in any suitable manner about T's and elbows of a piping system as shown in FIGS. 6 and 7 as well as about straight runs of the pipe. As shown in FIG. 6, narrow strips of webbing 18 are wrapped about the T fitting and are extended about the generally straight outside section 28 as well as the elbow shaped sections 30 and 32 thereof. When the webbing is overlapped in crossing manner as shown, some of the exterior surface regions of the T fitting will be covered by more layers of webbing material than others. It is only necessary however that all exterior surface regions of the T filling will be covered by at least the desired number of layers as is necessary for satisfaction of designed structural enhancement of the piping system. The same is true of structurally enhancing layers of pre-impregnated webbing on elbow fittings as shown in FIG. 7 and fittings of other design. The webbing 18 is applied in overlapping manner for covering the entire exterior surface of the elbow fitting with at least the minimum number of webbing layers to achieve designed enhancement of the structural integrity of the pipe system. When this done, some external surface regions of the fitting will be covered with more than the minimum number of webbing layers. Also, because the fiberglass webbing will have strands of biaxial or triaxial orientation, it will provide tensile resistance along each strand orientation. Moreover, when the pre-impregnated fiberglass webbing is overlapped, the various strands will establish tensile resistance along a multitude of integrated orientations, thus providing the external structually enhancing wrapping with efficient resistance to pressure. Thus, as the pipe or other vessel begins to be expanded, as its internal pressure approaches the maximum designed pressure thereof, the multilayered external wrapping of fiberglass/polymer composite material will provide the external surface of the vessel with support for resisting pipe expansion. The external wrapping of composite material will restore or enhance the strength of the pipe to the point where its burst pressure is increased to some minimum amount (idealistically 100 percent of the undamaged burst pressure of the pipe or the enhanced designed pressure if the pipeline is to be re-rated). The pipe lining will reduce strain in damaged or corroded areas of the pipe by providing reinforcement and increased stiffness to the region in question. The external pipe lining provides restraint so that leak-before-break occurs, thereby minimizing the potential for pressure induced rupture of the pipe. Local cracks which permit some leakage will occur well in advance of potential pipe rupture, thus providing an indication that pipe repair or replacement will soon be needed. If the pipe is becoming deteriorated as the result of external corrosion, the protective lining will additionally provide an effective seal to exclude the environment from the exterior surface of the pipe.

During installation of the lining care is taken to ensure that air is not trapped between layers of the pre-impregnated web material where it would interfere with complete surface-to-surface bonding of the layers of web material. Sufficient manual force is applied externally of the wrapped pre-impregnated webbing to ensure intimate surface-to-surface engagement of the wrapped pre-impregnated webbing with the outer surface of the pipe, taking care not to significantly stretch the webbing as it is brought into surface-to-surface contact with the pipe or with previously wound layers of the pre-impregnated web material. It is important to note that the pre-impregnated webbing has significant lateral flexibility to thus enable its wrapping in surface-to-surface contacting manner about unusually shaped objects, such as pipe T's, elbows, swages and the like as shown in FIGS. 6 and 7. When wrapping objects of unusual external surface configuration, some overlapping of the material will occur. It is only necessary to ensure that the external surface area of the object is covered with at least the minimum layers of webbing material to accommodate the pressure containing design characteristics that are intended.

In the event the pipe or other objects being wrapped are situated in an underwater environment it is only necessary that care be taken to ensure displacement of all of the water from between the layers of pre-impregnated polymer/webbing composition. Polymerization will only occur when adequate heat is externally applied for an adequate period of time.

As mentioned above, depending upon the structural enhancement that is desired for the resulting cured pipe repair liner, the liner may be defined by a plurality of layers of pre-impregnated web material wrapped layer upon layer. When this is done the upper or outer protective backing sheet is also peeled away from the pre-impregnated web material. Typically, the web material will be furnished in rolls of sufficient length for wrapping about the pipe the number of times that is desired for resulting liner thickness and thus resulting liner structural integrity. As the web material is rolled onto the pipe surface both of the backing sheets of the web will be peeled away and will typically be rolled to prevent the backing sheets from interfering with or complicating the pipe wrapping procedure. When wrapped in this manner, the layers of pre-impregnated fiberglass/polymer webbing material will be in surface-to-surface contact with one another. During layering of the webbing material it is necessary to ensure that the polymer filling material thereof comes into surface-to-surface contact and that no air bubbles are entrapped between layers. If the polymerization process is to be carried out in a water environment, the heating blanket will be provided with an outer thermal insulating layer to ensure that minimal heat is conducted to the water.

Curing of the layered pre-impregnated fiberglass/polymer webbing lining of the pipe is achieved through application of external heat. An external heater is arranged about the wrapped pipe preferably in heat transferring contact with the remaining backing of the outer layer of webbing and is tightened sufficiently to provide the uncured lining with slight external compression. The heater, which is typically an electrically energized sleeve or blanket type heater, is operated by a 12 volt D.C. circuit, which can be a battery powered electrical circuit. The heater is energized to heat the wrapped lining to a desired temperature for complete polymerization for a sufficient period of time to accomplish complete curing of the heat cured pre-impregnated resin of the webbing and to completely cure the slower curing epoxy of the pipe repair lining if such is used. For example a curing period of from about one-half hour to about three and one-half hours and preferably a curing period of about two hours may be employed at a curing temperature range of from about 100 degrees to about 400 degrees and preferably at about 250 degrees F., depending upon the character of materials that are utilized in the pipe repair lining process. When Armor Plate materials are used, the pre-impregnated fiberglass and Armor Plate 990QC epoxy putty can be heat cured in a period of from about 45 minutes to one hour at a temperature of about 180 degrees F.; thus the curing temperature and period for heat curing the pre-impregnated polymer of the biaxial or triaxial weave webbing polymer is ample for accomplishing complete curing of the epoxy putty filling any surface imperfections of the pipe or vessel.

Assuming two or more sections of pipe repair lining are applied, after installation of the pre-impregnated webbing in the manner described above the joints defined by the abutting edges of adjacent sections of the webbing will be filled and sealed with an epoxy material such as Armor Plate 990QC epoxy putty or Ciba Epoxy Araldite 2013 which is allowed to become cured. The filled joints will then be covered by one or more layers of heat curable biaxially or triaxially woven pre-impregnated fiberglass webbing material which will be wrapped about the joint and will be of sufficient width to overlap the adjacent edges of the lining sections to a desired extent. The wrapped joint linings will then be heat cured in the same manner as described above. If desired, before curing of the wrapped webbing material to form the repair linings, the joint wrappings will be applied. The wrapped webbing material and the joint webbing material can then be simultaneously cured by application of external heat thereto for a desired period of time.

The resulting pipe repair lining can be applied to pipes, tanks and other pressure containing vessels without necessitating taking them out of service. The process can be accomplished without the necessity for providing special mechanical equipment for the pipe wrapping process. A small crew of workers, using only conventional and portable equipment, can quickly provide pipe with a pipe repair lining even when working in "field conditions". Since the heating system for heat curing the pipe repair lining can be operated by means of a battery type electrical supply, field installation of the pipe repair lining system is readily facilitated.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for applying a polymer/webbing composite structural lining about the external surface of a pressure containing vessel, comprising:
   (a) cleaning the external surface of the vessel;
   (b) filling external surface imperfections in the external surface of the vessel with a polymer filler composition;
   (c) applying quick setting polymer material to a selected surface area of the vessel where the structural repair lining is to begin;
   (d) during the uncured state of the quick setting polymer material sticking one end of an elongate web of triaxially woven fiberglass fabric material pre-impregnated with a high temperature thermosetting polymer to the uncured layer of quick setting polymer material, with the elongate web being oriented for wrapping about the vessel and allowing the quick setting polymer material to become cured thus fixing one end of the elongate web to the external surface of the vessel;
   (e) wrapping the elongate web of said high temperature thermosetting polymer pre-impregnated triaxially woven fiberglass fabric webbing about the vessel such that the elongate web is in surface-to-surface engagement with the outer surface of the vessel and defines a desired number of layers covering the vessel;
   (f) assembling a heater about the wrapped elongate web; and
   (g) with the heater, applying sufficient heat at a temperature in the range of from about 100° F. to about 400° F. for a sufficient period of time to cure the polymer of the elongate web of polymer pre-impregnated, heat cured polymer/fiberglass fabric material and thus define the structural lining about the external surface of the pressure containing vessel.

2. The method of claim 1, wherein said cleaning the external surface of the pipe comprising:
   (a) removing external surface material from the pipe by abrasion; and
   (b) removing any bonding inhibitor material from the pipe by solvent cleaning.

3. The method of claim 1, wherein, said polymer filler composition being an epoxy filler and said quick set polymer composition being a quick set epoxy composition, said method comprising:
   after curing of said quick set epoxy composition, wrapping the elongate web of pre-impregnated, heat cured polymer/fiberglass fabric material about the pipe and the uncured epoxy filler.

4. The method of claim 1, wherein, said heater being an electrically energized heater, the method comprising;
   (a) electrically energizing the heater to a selected temperature within said temperature range of from about 100 degrees to about 400 degrees F.; and
   (b) maintaining said selected temperature within said temperature range for a period of from about one-half hour to about three hours.

5. The method of claim 1, wherein adjacent sections of said repair lining defining edge joints, said method comprising:
   (a) applying polymer putty to said edge joints; and
   (b) wrapping said edge joints with heat curable woven pre-impregnated fiberglass fabric joint webbing; and
   (c) curing said heat curable woven pre-impregnated fiberglass fabric joint webbing and said polymer putty to seal said edge joints.

6. The method of claim 5, wherein said polymer putty is epoxy putty, said method comprising:
   curing said polymer putty in place.

7. A method for applying a structural lining of chemical resistant material about the external surface of a pressure containing vessel, comprising:
   (a) cleaning the external surface of the pressure containing vessel;
   (b) filling any external surface imperfections in the external surface of the pressure containing vessel with an epoxy composition;
   (c) wrapping an elongate triaxially woven web of polymer pre-impregnated, heat cured fiberglass fabric material in desired orientation about the vessel such that the elongate web is in surface-to-surface and wrinkle free engagement with the outer surface of the vessel and where the web forms at least two layers and the layers of the web are in surface-to-surface and wrinkle free engagement with one another;
   (d) assembling a heater about and in intimate engagement with the wrapped elongate web; and
   (e) with the heater, applying heat at a temperature range of from about 100° F. to about 400° F. and for period of from about one-half hour to about three hours to cure the polymer of the elongate triaxially woven web of polymer pre-impregnated heat cured fiberglass fabric material and thus define the chemically resistant structural lining about the external metal surface of the pressure containing metal vessel.

8. The method of claim 1, comprising:
   (a) prior to said wrapping step, cleaning the external surface of the vessel by abrasion; and
   (b) removing any bonding inhibitor material from the vessel by solvent cleaning.

9. The method of claim 7, wherein, said polymer filler composition being an epoxy filler; and said quick set polymer composition being a quick set epoxy composition, said method comprising:
   after curing of said quick set epoxy composition, wrapping the elongate web of pre-impregnated, heat cured polymer/fiberglass fabric material about the vessel and the uncured epoxy filler.

10. The method of claim 7, wherein adjacent lining sections of said elongate web of pre-impregnated, heat cured polymer/fiberglass fabric material defining edge joints, said method comprising:
   (a) following heat curing of said elongate web of pre-impregnated, heat cured polymer/fiberglass fabric material, applying polymer putty to said edge joints;
   (b) wrapping heat curable polymer/fiberglass fabric joint webbing material about said edge joints; and
   (c) heat curing said elongate web of pre-impregnated, heat cured polymer/fiberglass fabric material and said polymer putty to seal said edge joints.

11. The method of claim 10, wherein said polymer putty is epoxy putty, said method comprising:

permitting said polymer putty to become cured in place while the metal pressure containing vessel remains static.

12. An external structural external lining for a metal pressure containing vessel, comprising:

(a) a quantity of polymer putty sufficient to fill any surface imperfections in said vessel;

(b) an elongate web of pre-impregnated, heat cured polymer/fiberglass fabric material defining edges and being adapted for spiral wrapping about the metal pressure containing vessel;

(c) a quantity of fast setting polymer material for attaching one of said elongate web to the metal pressure containing vessel in oriented position for wrapping thereof about the metal pressure containing vessel; and (d) heating means adapted for positioning about said spiral wrapped elongate web, said heating means being adapted for heating said spiral wrapped elongate web to a sufficient temperature and for a sufficient period of time for heat curing of said elongate web of pre-impregnated, heat cured polymer/fiberglass fabric material and for bonding thereof to the external surface of the metal pressure containing vessel and for bonding wrapped layers thereof to one another.

13. The external structural lining of claim 12, wherein:

said polymer putty and said fast setting polymer putty being epoxy compositions.

14. The external structural lining of claim 12, wherein said elongate web of pre-impregnated, heat curable polymer/fiberglass fabric material comprising:

(a) a woven fiberglass web;

(b) a quantity of polymer material being impregnated within said woven fiberglass web; and (c) removable protective backing sheets being adhered to the polymer impregnated fiberglass web, one of said protective backing sheets being removed during wrapping of said polymer impregnated fiberglass web to permit contact of said polymer impregnated fiberglass web with the metal pressure containing vessel.

15. The external structural lining of claim 12, wherein:

said polymer material being a polyester resin.

16. The external structural lining of claim 12, wherein:

said polymer material being bisphenol ester resin.

17. The external structural lining of claim 12, wherein:

said polymer material being from a group including heat curable polyester resin and bisphenal resin and having a polymerization temperature of from about 100° F. to about 400° F.

18. The external structural lining of claim 12, wherein:

said polymer material having the capability of being cured while submerged in water.

19. A method for applying a structural lining about the external surface of a pressure containing vessel, comprising:

(a) wrapping about the pressure containing vessel a plurality of layers of an elongate web of triaxially woven fiberglass material pre-impregnated with a heat cured polymer resin being cured with a phenylic resin and an orthophosphoric acid catalyst and having a polymerization temperature range of from about 100° F. to about 400° F. such that the elongate web is in surface-to-surface and wrinkle free engagement with the outer surface of the vessel and a plurality of layers of said web of triaxially woven fiberglass pre-impregnated material disposed in surface-to-surface contact between layers;

(b) assembling a heater about the wrapped elongate web of triaxially woven pre-impregnated fiberglass material; and (c) with the heater, applying heat at said polymerization temperature range of from about 100° F. to about 400° F. for a period of time in the range of from one-half hour to three hours to cure the polymer of the elongate web of triaxially woven pre-impregnated fiberglass fabric material and thus define the structural lining about the external surface of the pressure containing vessel.

20. The method of claim 18, comprising:

conducting said method steps (a), (b) and (c) submerged in a water environment.

* * * * *

UNITED STATES PATENT AND TRADEMARK OFFICE
CERTIFICATE OF CORRECTION

PATENT NO.    : 6,276,401 B1
DATED         : August 21, 2001
INVENTOR(S)   : Fred D. Wilson It is certified that error appears in the above-identified patent and that said Letters Patent is hereby corrected as shown below:

Title page,
ABSTRACT, line 11, delete "a" and insert -- of --.

Column 1,
Line 28, delete "18020" and insert -- 180° --.
Line 63, change "it" to -- its --.

Column 3,
Line 38, change "disbandment" to -- disbondment --.
Line 39, change "wraping" to -- wrapping --.

Column 5,
Line 27, change "Methyon" to -- Methylon --.

Column 6,
Line 53, correct the spelling of "enalbling" to -- enabling --.

Column 8,
Lines 3 and 11, correct the spelling of "wapping" to -- wrapping --.

Column 9,
Line 58, delete the second occurrence of "about".

Column 10,
Line 33, change "would" to -- wound --.
Line 54, insert -- is -- after "this".
Line 62, change "structually" to -- structurally --.

UNITED STATES PATENT AND TRADEMARK OFFICE
CERTIFICATE OF CORRECTION

PATENT NO. : 6,276,401 B1
DATED : August 21, 2001
INVENTOR(S) : Fred D. Wilson

It is certified that error appears in the above-identified patent and that said Letters Patent is hereby corrected as shown below:

<u>Claim 17,</u>
Line 7, change "bisphenal" to -- bisphenol --.

Signed and Sealed this

Second Day of April, 2002

Attest:

JAMES E. ROGAN
*Attesting Officer*      *Director of the United States Patent and Trademark Office*